K. CARTER.
DOUBLE ENDED SNAP HOOK.
APPLICATION FILED JAN. 3, 1910.
974,950.
Patented Nov. 8, 1910.
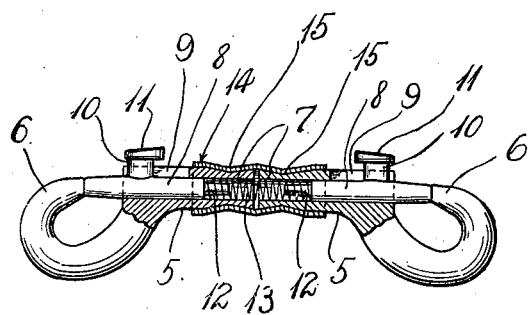
Witnesses.
E. R. Pollard
F. D. Ammen
Inventor.
Kenneth Carter.
by Hazard & Strauss
Attys

UNITED STATES PATENT OFFICE.

KENNETH CARTER, OF MONROVIA, CALIFORNIA, ASSIGNOR OF ONE-THIRD TO RAYMOND B. MILLARD, OF MONROVIA, CALIFORNIA.

DOUBLE-ENDED SNAP-HOOK.

974,950.  Specification of Letters Patent.  Patented Nov. 8, 1910.

Application filed January 3, 1910. Serial No. 535,942.

*To all whom it may concern:*

Be it known that I, KENNETH CARTER, a citizen of the United States, residing at Monrovia, in the county of Los Angeles and State of California, have invented new and useful Improvements in Double-Ended Snap-Hooks, of which the following is a specification.

This invention relates to snap hooks such as used for connecting straps or cords.

The device is expected to be especially useful when used in harnesses.

The object of the invention is to produce a snap hook which has a double ended construction and arranged in such a way that both ends of the hook may be opened simultaneously.

Another and important object is to provide a swivel connection between the hooks, so that straps and other parts of the harness to which they are attached will not become twisted and disarranged.

In the drawing annexed hereto the figure represents a side elevation of a double ended snap hook partially in section, provided with a swivel connection on its body.

Referring more particularly to the parts 5 designates the shanks of a double snap hook, the ends of which are bent around so as to form hooks having bills 6 which project inwardly toward the ends of the shanks. The shanks 5 are of tubular form having longitudinal bores 7, the ends of which are open and provided with plungers 8 forming keepers, the ends of these plungers being seated against the ends of the bills 6 when the snap hook is closed. The tubular shanks 5 are provided with longitudinal slots 9 which extend in from the ends thereof, and the sides of the keepers 8 have fins 10 which extend outwardly through these slots as shown. On the outer ends of the fins 10 enlarged thumb pieces 11 are formed which project away from each other so that by pressing them toward each other the keepers 8 may be withdrawn into the interior of the shanks. The inner ends of the keepers 8 are formed with centrally disposed stems 12 which retain the ends of a coiled spring 13, the ends of which thrust against the inner ends of the keepers. This spring is compressed when the keepers are withdrawn, as described, and affords means for returning the keepers to their normal extended position.

The ends of the shanks 5 are connected by a tubular sleeve 14 which forms a swivel and permits an independent rotation of each hook, thus preventing a twisting of the straps or harness to which they are temporarily attached.

In the form illustrated the exterior surfaces of the outer ends of the tubular shanks are each provided with an annular groove or depression 15, the sleeve 14 being similarly grooved and engaging the grooves formed in the shanks so as to maintain the hooks in a fixed relation to each other and at the same time permitting an independent swiveling movement of each hook.

What I claim is:—

A double ended snap hook having bills at the ends thereof and having a shank divided transversely into sections, each of said sections being provided with a longitudinally extending bore, said bores communicating and having the same axis, a swivel sleeve connecting the sections of said shank and permitting an independent swiveling movement of said bills, keepers in the form of plungers sliding in said bores, and a spring disposed in said bores between said keepers thrusting against the inner ends of said keepers and normally maintaining the same in contact with said bills.

In witness that I claim the foregoing I have hereunto subscribed my name this 27th day of December, 1909.

KENNETH CARTER.

Witnesses:
F. D. AMMEN,
EDMUND A. STRAUSE.